Oct. 23, 1956
C. C. RENNECAMP
2,767,922
MEANS FOR LIMITING FURNACE TEMPERATURE IN
ACCORDANCE WITH HEAT REQUIREMENT
Filed Feb. 27, 1953
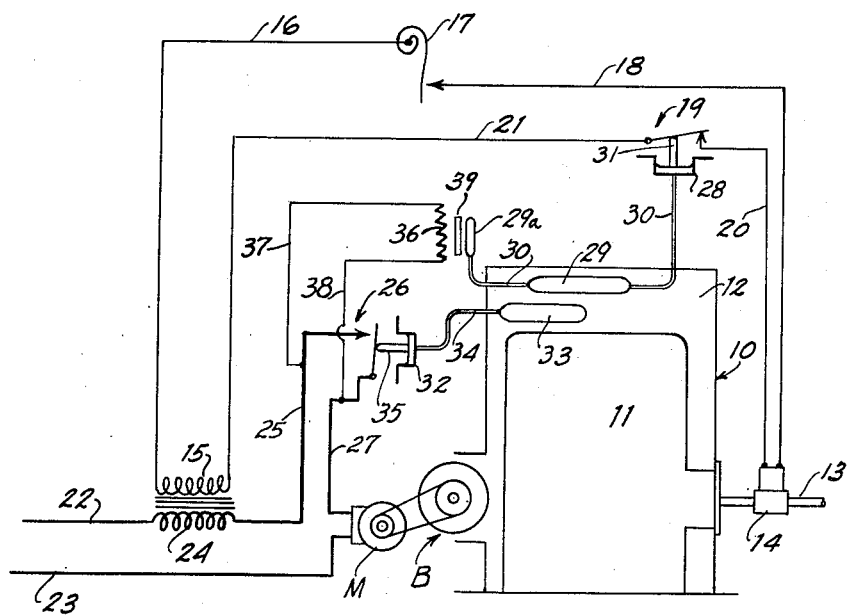
INVENTOR
CLARENCE C. RENNECAMP
By Charles E. Markham
HIS AGENT

2,767,922

MEANS FOR LIMITING FURNACE TEMPERATURE IN ACCORDANCE WITH HEAT REQUIREMENT

Clarence C. Rennecamp, Jennings, Mo., assignor to Missouri Automatic Control Corporation, St. Louis, Mo., a corporation of Missouri Application February 27, 1953, Serial No. 339,329

2 Claims. (Cl. 236—9)

This invention relates to control means for space heating systems, and particularly to means for controlling the temperature of the heat producing device in accordance with the heat loss rate from the heated space, so that a preselected space temperature may be more closely maintained by a space thermostat.

The primary object of the invention is the provision of a simple and inexpensive control means for a space heating system wherein a space thermostat controls the operation of the heat producer in an "on and off" manner, and wherein an intermediate controller variably limits the temperature of the heat producer in accordance with heat loss rate from the heated space.

A further object is to provide a heating control system having a space thermostat and a temperature limiting controller for limiting the temperature of the heat producer or heat conveying medium and including means for adjusting the temperature limiting controller in accordance with the ratio of "on time" to "off time" of the heat producer so as to permit the temperature of the heat producer to rise higher as its "on time" increases with relation to its "off time."

More specifically, it is an object to provide control means in a heating system as above, which further includes a heat circulating device which automatically operates to circulate heat when it is produced upon demand of the space thermostat, and wherein the control means functions to variably limit the temperature of the heat producer and consequently the temperature of the heat conveying medium in accordance with the ratio of "on time" to "off time" of the circulating device, so as to permit the temperature of the heat producer or heat conveying medium to rise higher as the "on time" of the circulating device increases with relation to its "off time."

The provision of these and other objects and advantages which appear from the following description and accompanying drawing are the purposes of the present invention.

In the drawing, the single figure of the drawing is a schematic view of a form of the present invention.

Referring to the drawing, a furnace is generally indicated at 10 having a combustion chamber 11, and a surrounding plenum 12 wherein air circulated by a blower B is heated. The blower B is driven by a motor M. The furnace is supplied with fuel through a fuel line 13 in which is interposed a normally closed electromagnetically operated fuel control valve 14 which, when energized, opens to supply fuel to the combustion chamber. A low voltage circuit for the energization and control of the valve 14 is provided and consists of a transformer secondary winding 15, a lead 16, a space thermostat 17, a lead 18, the valve 14, a lead 20, a thermostatic temperature limiting switch 19, and a lead 21 back to the transformer secondary winding 15. Production of heat is thereby started and stopped in an "on and off" manner by the closing and opening of the space thermostat. Power for the valve energizing circuit is provided from an available source through the lines 22 and 23 across which the transformer primary winding 24 is connected. The blower motor M is energized from the source of supply at line voltage through a circuit which may be traced as follows: the line 22, transformer primary winding 24, a lead 25, a temperature sensitive control switch generally indicated at 26, a lead 27, and through motor M to line 23. It is to be understood that the usual flame failure safety devices may also be included in this circuit. They have been omitted for the purpose of simplicity.

The thermostatic temperature limiting switch 19 is of the expanding liquid type having an expansible chamber 28, a bulb 29 filled with a thermally expanding liquid, a capillary tube 30 connecting the bulb and expansible chamber and an actuating rod 31 which, upon expansion of chamber 28, opens the normally closed switch. The construction and operation of a switch of this general character is described in Patent 2,291,502, issued July 28, 1942, to L. M. Persons.

The bulb 29 is shown disposed in the plenum 12 so as to be sensitive, for the most part at least, to the temperature of the heat conveying medium, which in this case is circulated air. It is to be understood, however, that insofar as the present invention is concerned, it is immaterial whether the bulb 29 is placed so as to be wholly sensitive to the temperature of the heat conveying medium at a point sufficiently near the furnace so as to substantially reflect furnace temperature, or placed against the combustion chamber heat exchanging wall, or even in the flue breaching. In any case, the result achieved will be to limit the temperature of the heat producing device.

An extension of bulb 29, which in the illustration takes the form of a smaller auxiliary bulb 29a connected to the main bulb 29 by a capillary tube 30, is placed sufficiently remote from the furnace so as not to be materially affected by the temperature of the furnace or the heat conveying medium. The extension 29a is also filled with the thermally expanding liquid. The temperature sensitive switch 26 is similar in construction to that of switch 19, being provided with an expansible chamber 32, a bulb 33 filled with a thermally expanding liquid, a capillary tube 34 connecting the bulb and expansible chamber, and an actuating rod 35 which, upon expansion of chamber 32, closes the normally open switch 26. The switch 19 is, however, normally closed and opens on rise in temperature, while the switch 26 is normally open and closes on rise in temperature.

Bulb 33 of the circulator control switch 26 is placed so as to be sensitive to the temperature of the heat conveying medium at a point near the furnace so as to reflect furnace temperature, and in this case, it is placed in the plenum so as to be in contact with the circulating warm air. When the furnace is operated and the air is heated, switch 26 closes to circulate the air, and remains closed until the air temperature drops due to discontinuance of furnace operation.

Adjacent bulb extension 29a of switch 19 and in heat exchange relationship therewith is an electrical resistance heater 36.

Heating of the bulb extension 29a by resistance heater 36 will cause an increase in the total volume of thermally expanding liquid acting upon the expansible chamber 28. Because of this less heating and expansion of the liquid in the main bulb portion 29 will be required in order to actuate the limit switch 19 to an open position. The heating of bulb extension 29a results, therefore, in a reduction in the temperature to which the furnace may rise. In other words, it varies in effect the temperature setting to which limit switch 19 responds to stop heat production.

The resistance heating element 36 is shunt connected across the blower control switch 26 by means of leads 37 and 38, so that when switch 26 is open, full voltage is applied across heating element 36 and it becomes heated, and so that when switch 26 is closed, the resistance element 36 is effectively shunted through a low resistance path consisting of the heavy motor leads 25 and 27 and motor M when running, whereby the element is rendered inoperative as a heater.

In order to more uniformly deliver the intermittent supply of heat from the heating element 36 to the liquid in bulb extension 29a, and particularly in order to eliminate "hunting," a heating reservoir is provided between the heating element 36 and the liquid in bulb extension 29a which provides a lag or time interval and extends the time required to vary the limiting switch 19 from its highest to lowest setting or vice versa. This reservoir may, in its simplest form, be provided by simply thickening the metal wall of bulb extension 29a. Preferably, however, a suitable mass of metal 39 is interposed between the heating element 36 and bulb extension 29a.

Operation

Under extreme conditions, wherein the heat loss rate from the space is such as to require full capacity operation of the furnace and blower B, the "on time" during which the space thermostat is closed and the furnace is operating will persist and no heat will be delivered to the liquid in bulb extension 29a by heating element 36. When this condition has prevailed for a sufficient interval to permit the cooling of mass 39 and the liquid in 29a to ambient furnace room temperature, the temperature limiting switch will be at its highest setting, as in the order of 200° Fahrenheit, and the temperature in the plenum to which bulb 29 is sensitive, must therefore rise to 200° Fahrenheit in order to open switch 19. The furnace will then, under these conditions, operate at a temperature of 200° Fahrenheit under control of the temperature limiting switch.

If, now, the heat loss rate from the space decreases, due to the weather becoming milder, the "off time," during which the space thermostat is open and the furnace and blower are inoperative, will increase and heat will be supplied to the liquid in bulb extension 29a in increasing amounts as the "off time" increases. As the temperature of this liquid in bulb extension 29a increases, the total volume acting on expansible chamber 28 increases and, consequently, the switch 19 will open in response to a progressively lower furnace temperature affecting the main bulb portion 29. The furnace under these conditions will now operate at some temperature below 200° Fahrenheit.

When the heat loss rate from the space becomes nil, that is, when no heat is required to maintain the selected space temperature, the "off time" of the furnace and the blower will persist and the element 36 will deliver heat continuously to the liquid in bulb extension 29a. When this condition has prevailed for a sufficient period, the liquid in bulb extension 29a will be heated to the maximum temperature to which element 36 is capable of heating it. At this maximum temperature of the liquid in bulb extension 29a, the volume increase of the liquid acting on expansible chamber 28 causes the limiting switch to be adjusted to its minimum operational setting, which may be in the order of 120° Fahrenheit. Under these conditions, the temperature of the furnace will then be limited to 120° Fahrenheit regardless of the demand by the space thermostat.

There will, of course, be some delay in the closing of switch 26 after the space thermostat 17 has closed to start operation of the furnace and switch 26 will, at the customary temperature setting, remain closed for a time after the space thermostat opens and stops operation of the furnace, due to the time required to carry away residual heat from the furnace. The operation of the blower control switch does, however, follow the operation cycles of the space thermostat and even though it is out of phase with the space thermostat, it reflects the rate of heat loss from the space, and the operating temperature of limiting switch 19 is, therefore, varied in accordance with the heat loss rate.

A principal advantage of the arrangement is that of saving in cost. The switch 19, except for its bulb extension 29a, and the circulator control switch 26 are both customarily part of a conventional heating system, so that by merely providing the bulb extension 29a and connecting a resistance winding across the terminals of the blower control switch 26, an attractively economical and simple means for varying the temperature of the heat producing device in accordance with the heat loss rate of the space is provided.

The type of temperature responsive circulator control switch 26 used is immaterial to the operation of the present invention, any suitable temperature sensitive switch may be used. Further, while the temperature sensing bulb of the liquid filled-type temperature limiting switch 19 is admirably adapted to the present purpose, other types of temperature limiting switches may be used; for example, the temperature limiting switch 19 may be actuated by a divided helical bimetal coil having a major division disposed so as to be sensitive to furnace temperature and a minor devision remote therefrom and connected thereto by a non-conducting torque rod, whereby the minor division may be heated independently by the element 36 so as to vary the temperature setting of the switch.

It is to be also understood that in a simpler form of the invention the provision of remotely spaced extension 29a may be dispensed with and the heater 36 placed within the plenum adjacent the bulb 29, so that heat may be applied to a portion of the bulb. The principal advantages of providing an extension of the bulb portion and disposing it outside of the plenum are to avoid blocking or interfering with heat transfer characteristics of the bulb 29 so as to effect its sensitivity and to avoid a variable which may be introduced due to cooling of the heating element or heat reservoir by circulation of air in the plenum.

I claim:

1. In a space heating system, a temperature sensitive limit switch for limiting the temperature of an electrically controlled heat producer having a temperature sensitive actuator element disposed so as to be sensitive to heat producer temperature, an electrical resistance heating element for heating at least a portion of said actuator element under certain conditions thereby to vary the operating temperature of said limit switch with respect to the temperature of the heat producer, a heat circulator energizing circuit including a temperature sensitive switch sensitive to the temperature of the heat conveying medium at a point near the heat producer and responsive to a rise in temperature to close the circuit, and leads connecting said resistance heating element to the opposite terminals of said circulator control switch so that said heating element is energized when the switch is open and so that it is shunted by the switch when it is closed.

2. In a space heating control system, a temperature sensitive limit switch for limiting the temperature of an electrically controlled heat producer, said limit switch including a temperature sensitive actuator element disposed so as to be sensitive to heat producer temperature, a heat circulator energizing circuit, an electrically operated local heater arranged to heat at least a portion of said limit switch actuator element, an energizing circuit for said electrically operated local heater, and a temperature sensitive control switch sensitive to the temperature of the heat conveying medium to be circulated and being responsive to a rise in the temperature thereof to complete said circulator energizing circuit, and to effect de-energization of said electrically operated local heater, and being responsive to a decrease in the temperature of the heat conveying medium to break said circulator energizing circuit and to effect energization of said electrically operated local heater.

References Cited in the file of this patent

UNITED STATES PATENTS

| | | |
|---|---|---|
| 2,355,043 | Adlam | Aug. 8, 1944 |
| 2,425,998 | Crise | Aug. 19, 1947 |
| 2,510,481 | Sagar | June 6, 1950 |
| 2,607,532 | Lehane | Aug. 19, 1952 |

FOREIGN PATENTS

| | | |
|---|---|---|
| 447,672 | Great Britain | May 22, 1936 |
| 849,513 | France | Aug. 21, 1939 |